United States Patent [19]
Giordani et al.

[11] Patent Number: 5,664,939
[45] Date of Patent: Sep. 9, 1997

[54] CIRCULATOR PUMP CHECK VALVE

[75] Inventors: Attilio G. Giordani, New Port Richey, Fla.; Richard A. Genga, Jr., East Greenwich, R.I.

[73] Assignee: Taco, Inc., Cranston, R.I.

[21] Appl. No.: 508,393

[22] Filed: Jul. 31, 1995

[51] Int. Cl.⁶ .................................................. F04B 39/06
[52] U.S. Cl. ................................................................ 417/369
[58] Field of Search ............................... 417/368, 369, 417/370; 137/454.4

[56] References Cited

U.S. PATENT DOCUMENTS

| | | |
|---|---|---|
| 40,723 | 11/1863 | Gilson ............................ 137/454.4 |
| 2,925,041 | 2/1960 | Sigmund ............................ 417/369 |
| 3,135,220 | 6/1964 | Haynes . |
| 3,225,698 | 12/1965 | Spisiak ............................ 417/368 |
| 3,276,385 | 10/1966 | Marlow . |
| 3,416,454 | 12/1968 | Dowdican . |
| 3,664,759 | 5/1972 | Biheller . |
| 4,324,526 | 4/1982 | Berchtold et al. . |
| 4,773,822 | 9/1988 | Jensen et al. . |
| 5,011,372 | 4/1991 | Nigrelli et al. . |
| 5,201,633 | 4/1993 | Peu . |

*Primary Examiner*—Richard E. Gluck
*Attorney, Agent, or Firm*—Fish & Richardson P.C.

[57] ABSTRACT

An wet-rotor hydronic heating/cooling circulator in which a check valve is positioned at the inlet eye of the pump impeller, where it can easily be serviced by removing the circulator motor and impeller. The check valve is preferably in the form of a valve subassembly that is removably inserted into an opening at the eye.

23 Claims, 6 Drawing Sheets

CIRCULATOR PUMP CHECK VALVE

BACKGROUND OF THE INVENTION

The invention relates to check valves for hydronic heating and cooling systems.

It is customary to install check valves on the outlet side of each circulator in a hydronic system, both to isolate each zone from others and to prevent gravity circulation through the system. Gravity circulation occurs as the result of cooler, denser fluid in the return lines of a particular zone "falling," suctioning heated, less dense fluid into the given zone. The check valves are usually sweated into the supply line of each zone, downstream of the circulator.

Check valves are also used in multiple-zone hydronic systems, to prevent backflow into a non-operating circulator zone from an adjacent operating zone.

Various forms of circulators are known. Some circulators employ a separate electrical motor coupled to a separate pump. Another form of circulator is the so-called "wet-rotor" circulator, in which the pump and motor are integrated, resulting in a more compact overall circulator unit. In a wet-rotor circulator, the rotor is supported within a rotor housing into which the fluid being circulated is allowed to enter (the fluid helps to lubricate the rotor bearings). The rotor housing is supported within a surrounding stator, which is sealed from the circulating fluid. An impeller, attached to the rotor, extends from the rotor housing into an impeller casing. Water entering the impeller casing flows from an inlet port to the eye of the impeller, and then outward to an outlet port. Servicing the motor or impeller is done by unbolting the motor housing from the impeller casing. This provides access to both the motor and the impeller, without disturbing connections between the impeller casing and the pipes to which it is connected.

The typical check valve is a separate unit installed downstream of the circulator. Service of such a check valve typically requires removing the valve from the pipe, and substituting a new unit.

Efforts have been made to integrate the check valve into the outlet port of the impeller casing (e.g., as suggested by dashed lines 22 in FIG. 1). But so installed, it is necessary to break the connection between the impeller or pump casing 12 and the pipes to which it is connected, and remove the pump casing, in order to remove the check valve. Only then can the check valve be slid out of the pump casing axially as suggested by arrow 24. This makes field replacement difficult and laborious. Because check valves in the hydronic circulator environment are subject to frequent clogging and failure there has long been a need for a check valve which could be easily and quickly replaced in the field.

SUMMARY OF THE INVENTION

The present invention features an improved hydronic circulator in which a check valve is positioned at the inlet of the eye of the impeller, where it can easily be serviced simply by removing the motor and impeller. So positioned, the check valve can easily be inspected at the same time as the impeller or motor are serviced.

The valve may be any type of check valve, including, for example, rotational thrust valves, disc valves and pop-up valves. Preferred valves are biased, e.g., spring-biased, towards the closed position of the valve to prevent backflow during conditions of low flow pressure. Preferably, the spring rate is about 0.01 to 0.2 lbs./inch, and the spring is stainless steel.

Preferably the valve is provided in the form of a valve subassembly which can be inserted into the eye as a single unit, for ease of installation and replacement. The check valve may further include a housing dimensioned to be press-fit into the inlet opening at the eye of the impeller, dimensioned to receive the valve subassembly. The housing preferably includes a first portion having an aperture which is sealed by the valve member when the valve is in its closed position. The housing may also, in some embodiments, include a second portion, downstream of the first portion, having an aperture through which fluid can flow to the impeller eye. The check valve preferably further includes a fastener, e.g., a clip, to prevent the check valve from being accidentally displaced from the eye. This clip preferably provides the second portion of the valve housing.

Preferably, the valve member is biased towards its closed position, e.g., by a spring. The valve member may include an elastomeric sealing portion disposed where the valve member seats against the valve seat, or it may in some cases be desirable for the valve member to make metal-to-metal contact, e.g., if the biasing spring is very lightly loaded or if the environment would cause excessive wear of an elastomeric seal.

In one preferred embodiment, the valve member comprises a shaft and a seating member, mounted on the shaft. The seating member preferably has a semi-spherical seating surface. The smooth curve of the seating surface allows it to seat tightly against the valve seat even if the seating member or shaft is not optimally aligned with respect to the valve seat. Check valves according to this embodiment may also include, in some cases, a plunger including a cup-shaped portion dimensioned to receive the semi-spherical seating surface.

In another embodiment the valve member includes a substantially cylindrical portion and a ring portion having a substantially V-shaped or U-shaped cross-section. The ring portion protrudes radially from the outer surface of the cylindrical portion and is positioned so that one surface of the ring portion seats against the edge of the aperture of the first portion of the housing when the valve is in its closed position. The valve member may include two substantially cylindrical portions, one above and one below the ring portion, having different diameters.

In another embodiment, the valve member includes a resilient member which is mounted to seat against an edge of the aperture of the first portion of the housing when the valve is in its closed position and move towards the eye in response to flow from the inlet, either by the periphery of the disc moving vertically towards the eye or by the resilient member folding up towards the eye about a central retaining member.

In embodiments in which the valve is biased towards one position, e.g., spring-biased, the valve can advantageously be mounted at any orientation, and does not need to be maintained in a predetermined position in which it is held in its normal position by gravity.

Other features and advantages of the invention will be apparent from the following description of preferred embodiments, and from the claims.

BRIEF DESCRIPTION OF THE DRAWINGS

FIG. 2A is a side view of the valve member; FIG. 2B is a top view of the valve clip; FIG. 2C is a side view of the spring housing.

DESCRIPTION OF THE PREFERRED EMBODIMENTS

Figure 1:
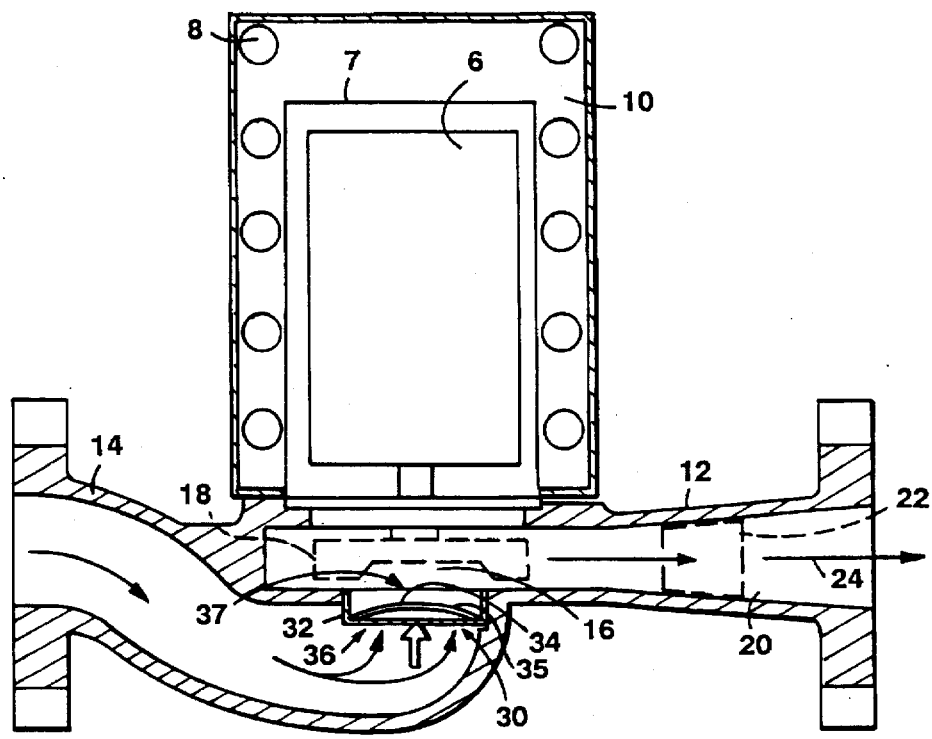
FIG. 1 shows a schematic partially cross-sectional side view of a hydronic circulator showing the positioning of a prior art check valve (dashed lines 22) and the positioning of a check valve 36 according to one embodiment of the invention.

As shown in FIG. 1 and discussed above, the typical wet-rotor circulator includes a motor 10 installed on a pump casing 12. The motor includes a rotor 6, rotor housing 7, and stator 8. Water enters the pump casing through inlet 14, flows into the eye 16 of the impeller 18, and exits the casing through outlet 20. In the prior art, a check valve has been placed along the outlet flow path as suggested in dashed lines 22. According to the present invention, the relatively inaccessible check valve previously located in the outlet flow path has been replaced by an easily accessed check valve 30 at the eye of the impeller. The check valve is provided in valve subassembly form, including a valve subassembly housing 32 that is dimensioned to press-fit sealingly into the eye 16, and a valve member 34 disposed in the valve subassembly housing. The valve subassembly housing includes a first portion 36 having an aperture 38 (FIG. 2) which is sealed by the valve member when the valve is in its closed position, and may include a second portion 37, downstream of the first portion, having an aperture 40 (FIG. 2) which provides a place to mount a spring biasing mechanism and which can also serve as a clip to secure the check valve in position in the eye.

As shown schematically in FIG. 1, the valve may comprise a simple disc valve member 34 positioned so that the periphery 35 of the disc valve member 34 moves vertically towards the eye in response to pressure from the inlet, causing the valve to open. The periphery is pressed against the edge of the aperture in the first portion by back pressure, causing the valve to seal in its closed position and prevent backflow under low inlet flow conditions. In this embodiment, it is preferred that the valve member have the shape shown in FIG. 1A, and include a metal ring 26 at the periphery, as shown, to prevent the periphery from becoming damaged and distorted during operation.

Figure 1B:
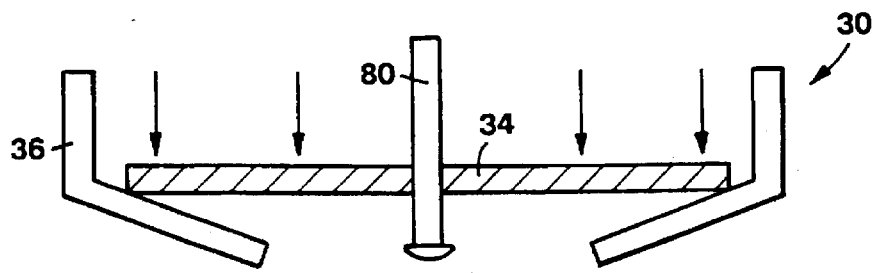
FIGS. 1B and 1C show the valve shown in FIG. 1, in closed and open positions, respectively.
Figure 1C:
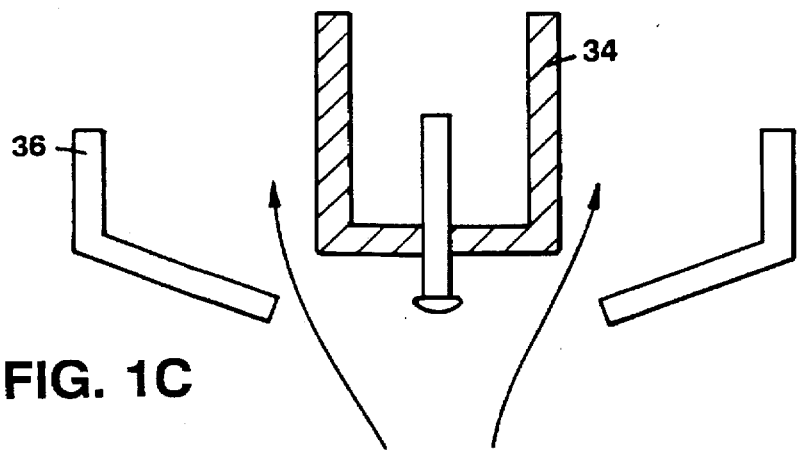

In the embodiment shown in FIG. 1B, resilient valve element 34 is mounted on a central retaining member 80 in housing portion 36. During low or high inlet flow conditions, back pressure (arrows in FIG. 1B) will force the valve element against the housing portion 36, causing it to seal in the closed position shown in FIG. 1B. In response to flow from the inlet (arrows in FIG. 1C), the valve element will fold up around the retaining element, as shown in FIG. 1C.

Figure 2:
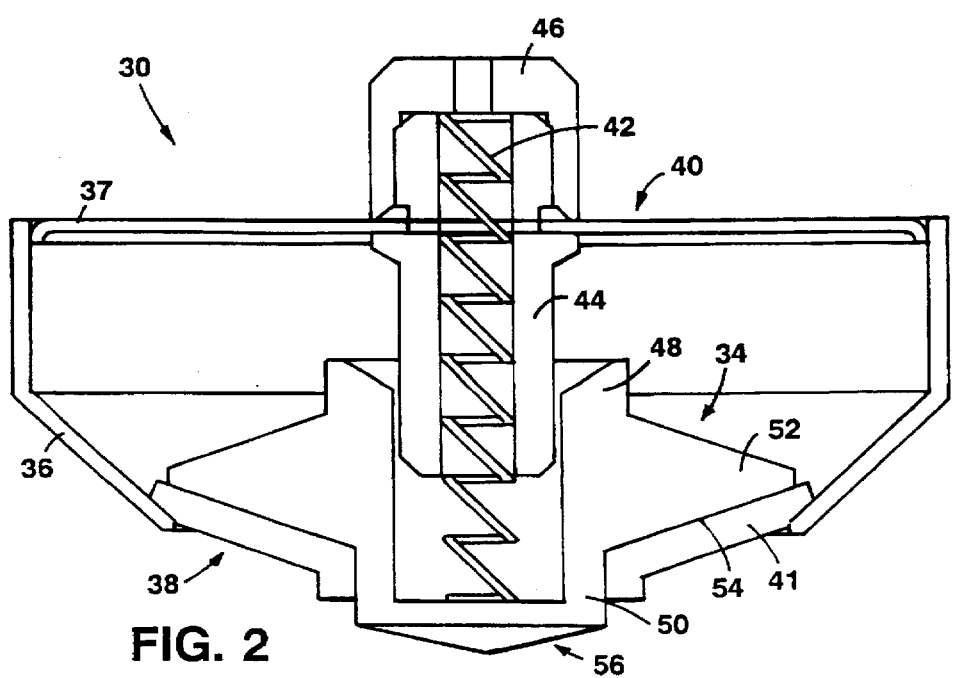
FIG. 2 is a cross-sectional side view of a valve subassembly according to one embodiment of the invention.

In one embodiment, shown in FIG. 2, the check valve includes first and second portions 36 and 37, valve member 34, and spring 42 which is positioned in spring housing 44 and spring housing cap 46. The check valve further includes a valve seal 41. Valve seal 41 may be elastomeric, or, if a metal-to-metal seal is desired, it may be metal.

Figure 2A:
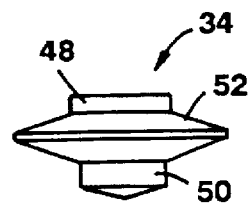
FIGS. 2A–2C are detailed views of individual components of the valve subassembly of FIG. 2.
Figure 2B:
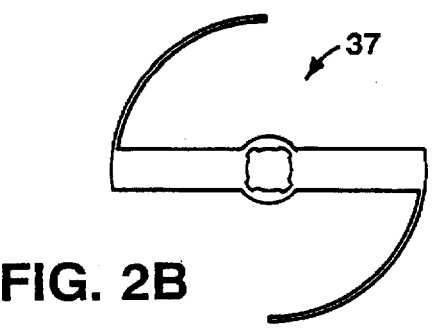
Figure 2C:
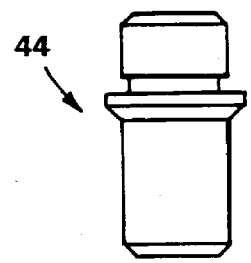

The valve member 34 is biased towards its closed position by spring 42 to prevent backflow through the check valve during low or high inlet flow pressure conditions. Spring 42 is mounted as shown in spring housing 44 (shown in detail in FIG. 2C) and secured in the spring housing by spring housing cap 46.

The valve member 34 includes two substantially cylindrical portions 48, 50 having different diameters and a ring portion 52 having a V-shaped cross-section protruding radially from the outer surface of the substantially cylindrical portions. Instead of the V-shaped cross-section shown, the ring may alternatively have a U-shaped cross-section. The U-shaped cross-section advantageously allows the valve member 34 to seat properly even if the valve member is displaced slightly from its normal position. The ring portion is positioned so that one surface 54 of the ring portion seats against the edge of the aperture of the first portion of the housing when the valve is in its closed position. The ring portion is preferably formed of metal. The valve member further includes a smoothly tapered leading edge 56, to smooth flow of fluid past the valve member.

In this embodiment, the second portion 37 of the housing (shown in detail in FIG. 2A), which functions to retain the spring housing, also functions as a clip which is press-fit into the eye to secure the valve subassembly in place in the eye. The second portion is preferably formed of resilient material, e.g., spring steel, so that it can be easily snapped in and out of the eye.

Spring housing 44 and spring housing cap 46 and valve member are preferably soft brass. The housing and valve clip are preferably formed of spring steel, e.g. 304 stainless steel, 30 gauge.

Figure 3:
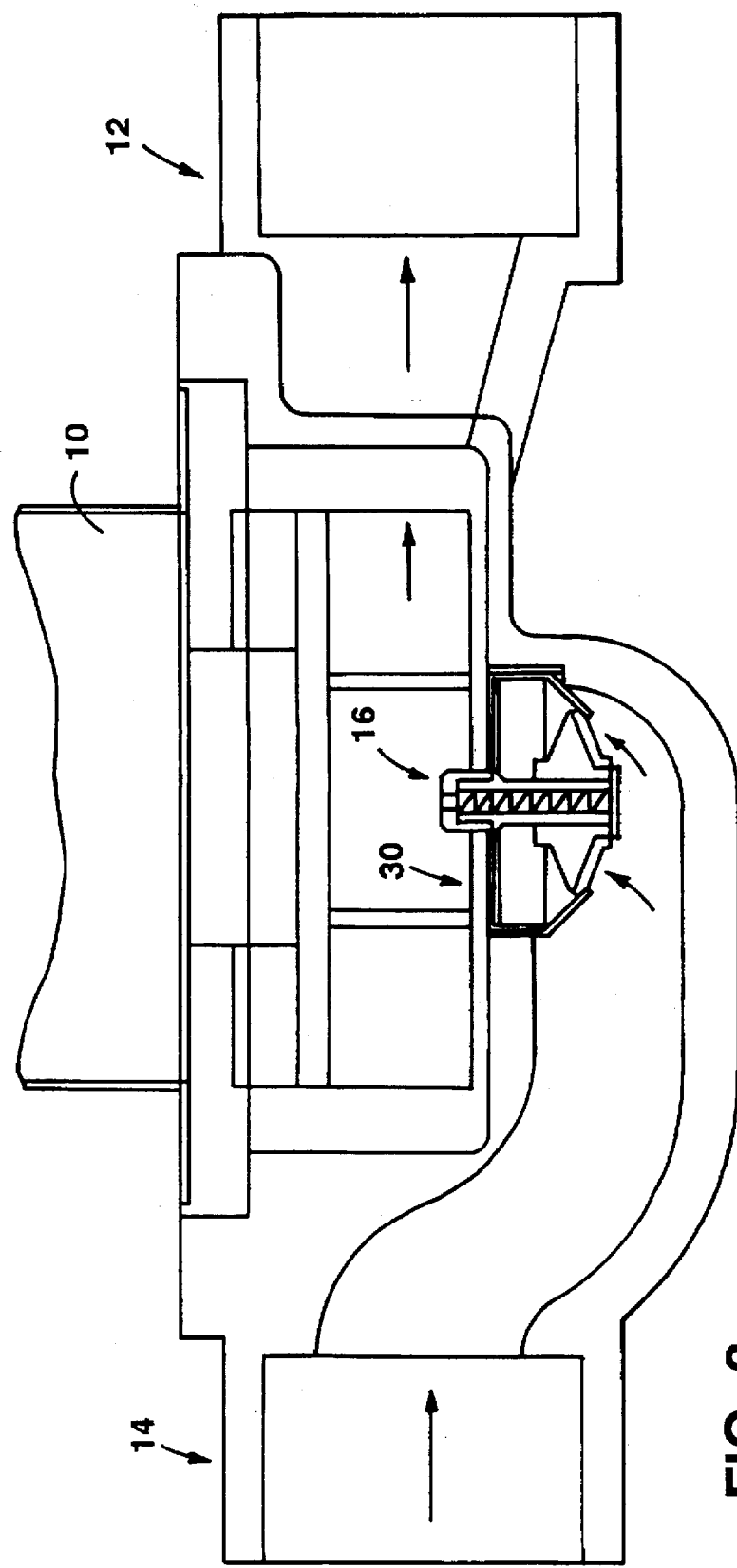
FIG. 3 is a schematic cross-sectional side view of a hydronic heating/cooling system having the valve subassembly of FIG. 2 positioned at the eye of the pump impeller.

FIG. 3 shows the valve subassembly of FIG. 2 installed in a hydronic circulator. The valve is shown in its closed position, but would be moved to the open condition by flow in the direction of the arrows. The valve subassembly could be easily removed and replaced simply by removing pump 10 and snapping the valve subassembly out of the eye.

Figure 4:
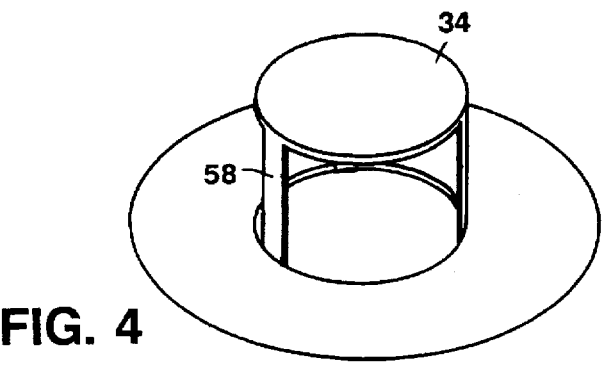
FIG. 4 is a schematic perspective view of a check valve according to another embodiment of the invention.
Figure 5:
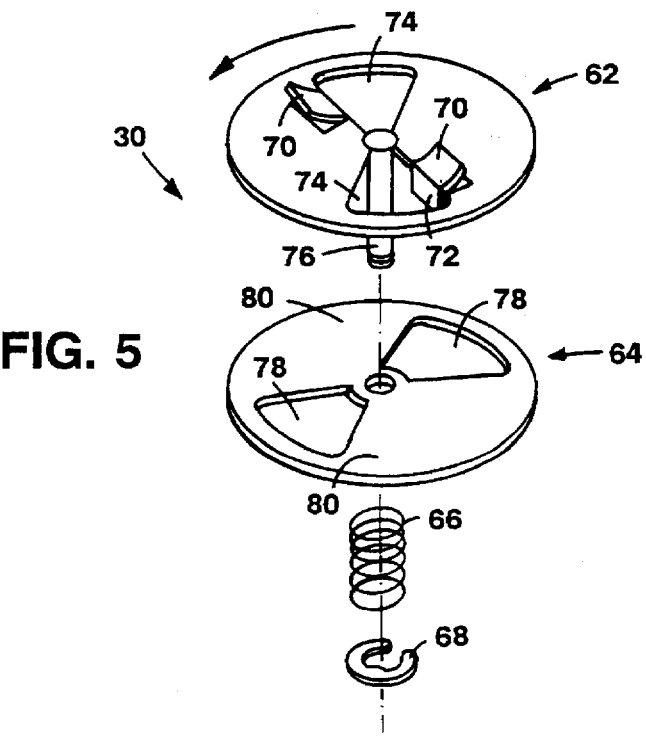
FIG. 5 is an exploded perspective view of a check valve according to another aspect of the invention.

FIGS. 4–5 show alternate check valve constructions. For clarity, these constructions are not shown provided in a valve subassembly housing. However, it is preferred in most cases that the valve be provided in the form of a valve subassembly for ease of installation and removal. Each of the constructions shown in FIGS. 4–5, as well as numerous other known valve constructions, could easily be provided in a valve subassembly housing in a manner similar to the valve of FIG. 2, as would be readily apparent to one skilled in the art.

Figure 4A:
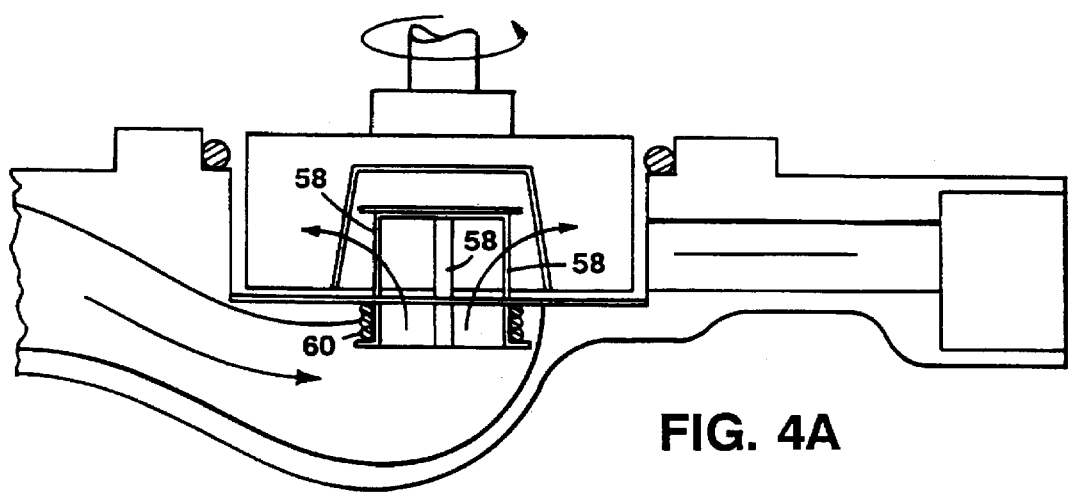
FIG. 4a shows the valve of FIG. 4 in its open position in a hydronic heating/cooling system.

FIGS. 4 and 4a show a pop-up valve including a valve member 34, pop-up members 58, and compression spring 60. Compression spring 60 pulls the valve element downward, biasing it towards it closed position. This embodiment is desirable from a flow standpoint, as fluid can flow directly to the eye of the impeller without having to flow outwardly around an outwardly extending valve element.

FIG. 5 shows an exploded view of a rotational thrust valve 30. Valve 30 includes rotating disc 62, stationary disc 64, torsion/compression spring 66, and retaining ring 68. Rotating disc 62 includes paired rotational thrust vanes 70 and rotation stops 72, apertures 74 to allow fluid flow, and axle 76 about which the disc rotates. The stationary disc 64 includes apertures 78 and solid portions 80. When assembled, the rotating disc faces the inlet, and the stationary disc is disposed between the rotating disc and the eye. When the valve is closed, apertures 74 in the rotating disc are aligned with solid portions 80 of the stationary disc, preventing backflow. When the rotational thrust vanes 70 are acted upon by the swirling flow of fluid (arrow) caused by impeller rotation the disc will rotate as far as allowed by the rotation stops, bringing apertures 74 into alignment with apertures 78 and allowing flow through the valve. Torsion/compression spring 66 is positioned to bias the rotating spring towards its closed position.

Figure 1A:
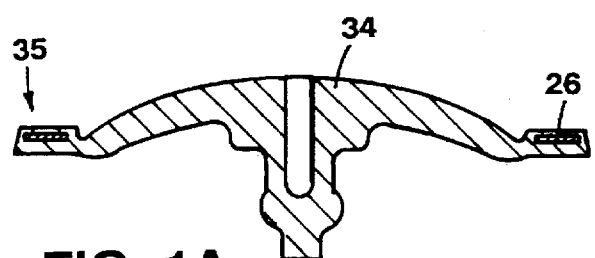
FIG. 1A is a cross-sectional side view of a preferred valve member for use in the valve shown in FIG. 1.

An advantage of the valves of FIGS. 4 and 5 (over those of FIGS. 1-3) is that the valve allows flow closer to the central axis of the impeller, which is the location at which flow is most efficiently provided to the impeller, whereas the design shown in FIGS. 1 and 1A tends to deliver flow at a radial outward location relative to the axis. For this reason, it is typically desirable to use small diameter valve elements when using the types of valves shown in FIGS. 1-3.

Figure 6:
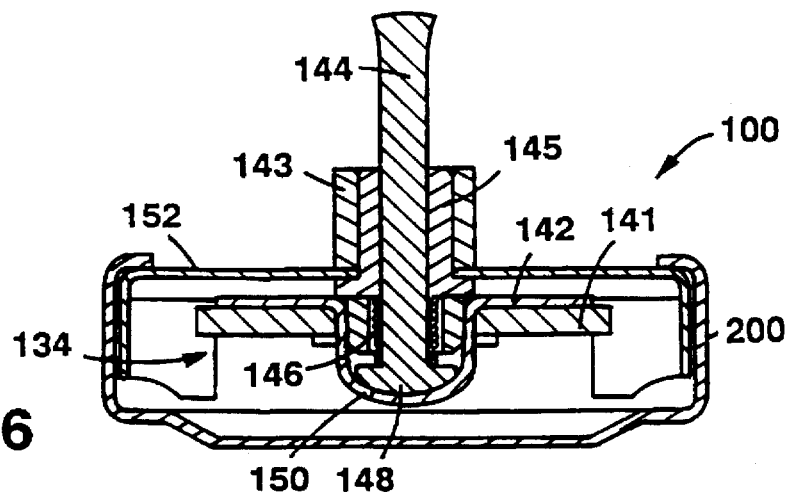
FIG. 6 is a cross-sectional side view of a valve subassembly according to another embodiment of the invention.
Figure 6A:
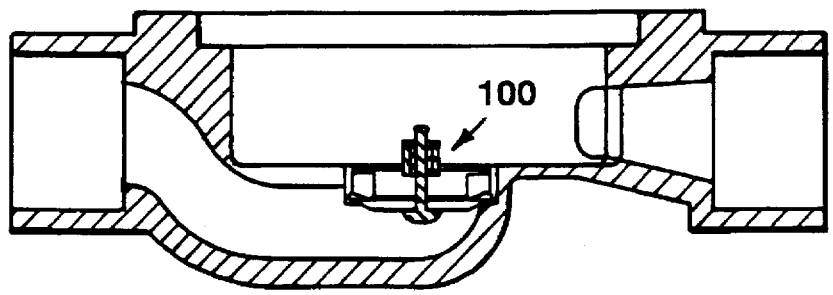
FIG. 6A shows the valve subassembly of FIG. 6 in position in a pump casing.

In another embodiment, shown in FIGS. 6-6a, the valve member 134 of valve 100 includes a valve seal 141 mounted on a plunger 142. The valve member is biased towards its closed position (FIG. 6a) by a valve stem 144 and spring 146, which are held in place by bushing retainer 143 and bushing 145. Valve stem 144 preferably has a semi-spherical, dome-shaped portion 148, and plunger 142 preferably has a corresponding cup-shaped portion 150, dimensioned to receive the dome-shaped portion of the valve stem. The rounded surfaces of the cup-shaped and dome-shaped portions allow some pivoting movement of the valve plunger within the housing 200, so that the sealing surface of the dome-shaped portion will be able to pivot and seal against the seat even if the valve stem is displaced to a certain extent from its optimal alignment. Preferably the dome-shaped portion is dimensioned so that the sealing surface will seal against the seat when the valve stem is displaced up to about 5° from its normal position.

Figure 6B:
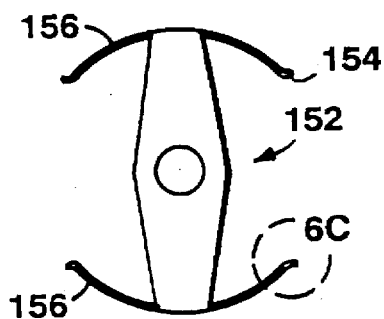
FIG. 6B is a top view of one of the components of the valve shown in FIG. 6.
Figure 6C:
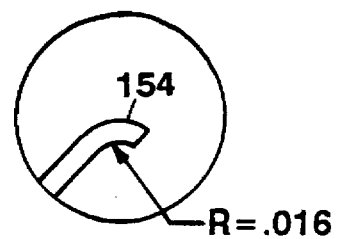
FIG. 6C is a highly enlarged view of a portion of the component shown in FIG. 6B.

A preferred valve clip 152 for use with the valve of FIG. 6 is shown in FIGS. 6B and 6C. As shown in detail in FIG. 6C, valve clip 152 includes a curl 154 at each of its free ends. Curl 154 provides force to grip against housing 200. This feature can also be utilized with the valve subassembly valve shown in FIG. 2.

Figure 7:
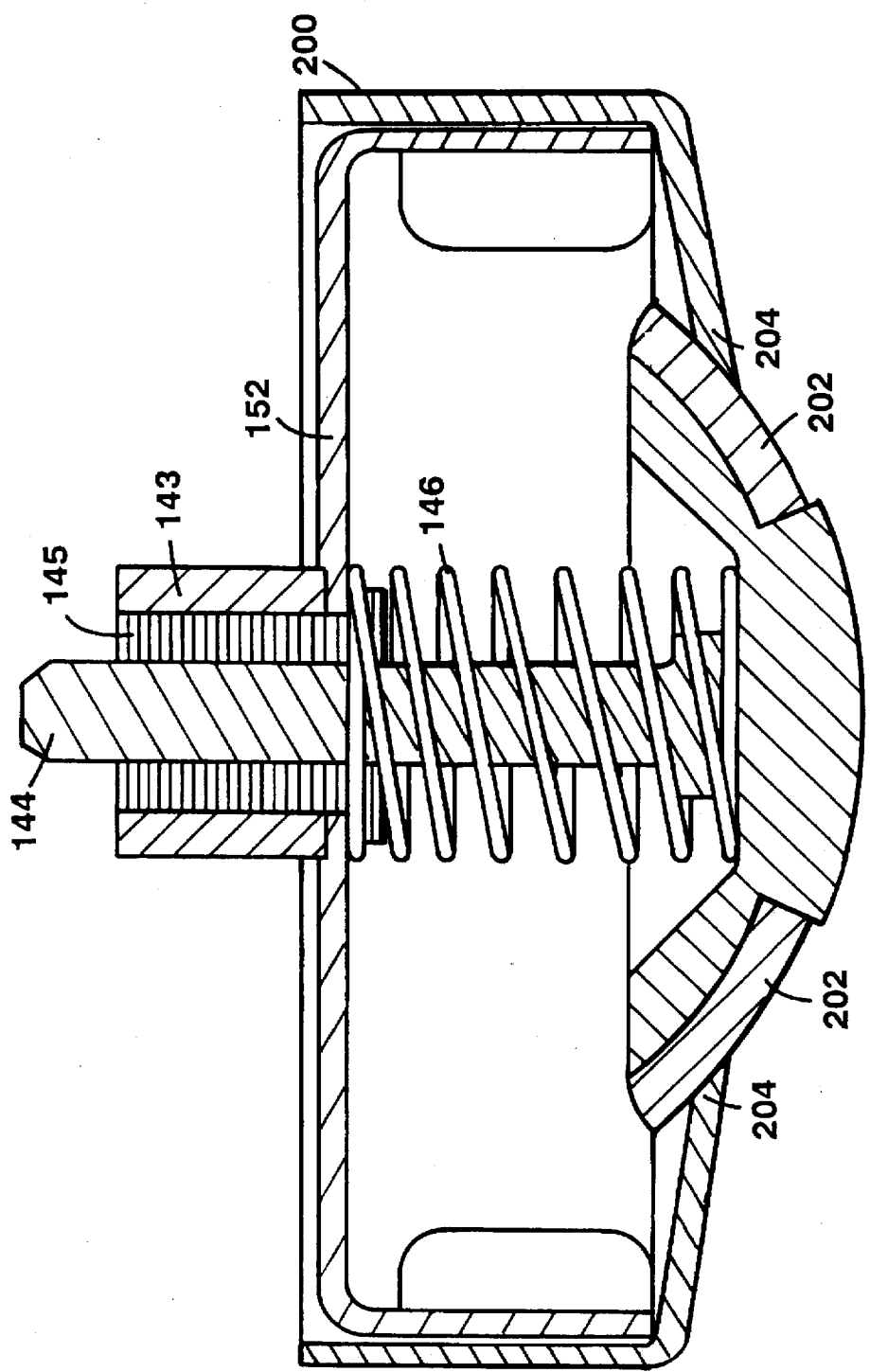
FIG. 7 is a cross-sectional side view of a valve subassembly according to another embodiment of the invention.

Another preferred embodiment is shown in FIG. 7. This embodiment is similar to that shown in FIG. 6, except that semi-spherical seating surface 202 directly contacts seat 204, rather than contacting a cup-shaped plunger as in FIG. 6. As in the embodiment shown in FIG. 6, the smooth curve of the seating surface allows it to seat tightly against the valve seat even if the seating member or shaft is not optimally aligned with respect to the valve seat. Seating surface 202 is preferably elastomeric, as shown, but may also be metal if a metal-to-metal seal is desired.

Other embodiments are within the claims.

For example, in the aspect of the invention in which a valve is provided in valve subassembly form, while one preferred type of valve is shown in FIG. 2, other types of valves may be provided in valve subassembly form. Similarly, in the aspect of the invention in which a check valve is provided at the eye of the impeller in a hydronic circulator, while preferred valves have been shown, any suitable type of check valve may be used, as would be evident to one skilled in the art.

Moreover, while some preferred valve subassemblys include a housing portion which provides the valve seat, alternatively the valve element may be provided in the form of a valve subassembly which is dimensioned to fit into a valve seat machined into the pump casing.

We claim:

1. A hydronic circulator for circulating fluid, the circulator comprising:
   a wet-rotor circulator motor, the circulator motor comprising
   a motor housing,
   a stator disposed within the motor housing and sealed from the circulating fluid,
   a rotor housing disposed within the motor housing within the stator, the rotor housing being unsealed from the circulating fluid so that the fluid enters the rotor housing,
   a rotor disposed within the rotor housing and in contact with the fluid, and
   an impeller affixed to one end of the rotor, the stator and rotor configured with respect to one another so that the rotor is caused to rotate when the stator is energized;
   an impeller casing fastened to the motor housing, the impeller casing comprising
   an inlet end for accepting the circulating fluid flowing into the impeller casing,
   an impeller zone into which the impeller extends from the motor, the impeller zone having an eye portion through which fluid is drawn into the impeller zone from the inlet end of the impeller casing, and
   an outlet end for discharging the circulating fluid flowing from the impeller casing; and
   a check valve positioned at said eye portion so that fluid flowing from the inlet end passes through the check valve before reaching the impeller, said check valve impeding flow in a reverse direction from the impeller zone to the inlet end.

2. A hydronic circulator of claim 1 wherein said check valve is provided in the form of a valve subassembly which is mountable in said eye portion as a single unit.

3. A hydronic circulator of claim 2 wherein said valve subassembly is dimensioned to be removably received into an opening at the eye portion of the impeller, and comprises a valve member configured to open in response to pressure from fluid flowing from the inlet end toward the impeller, and to close in response to pressure from fluid flowing in the reverse direction from the impeller toward the inlet end.

4. A hydronic circulator of claim 3 wherein said valve subassembly further includes a housing comprising a first portion dimensioned to be received into an opening at the eye portion of the impeller, said first portion having an aperture which is sealed by said valve member when said check valve is in its closed position.

5. A hydronic circulator of claim 4 wherein said valve housing further comprises a second portion, downstream of said first portion, having an aperture through which fluid can flow to the impeller eye.

6. A hydronic circulator of claim 3 wherein said impeller casing includes a machined valve seat, dimensioned to be sealed by said valve member, and said valve subassembly is dimensioned to be removably received into said machined valve seat.

7. A hydronic circulator of claim 2 wherein said check valve comprises a clip to prevent the check valve from being accidentally displaced from the eye.

8. A hydronic circulator of claim 5 wherein said second portion is adapted to prevent the check valve from being accidentally displaced from the eye.

9. A hydronic circulator of claim 3 wherein said valve member is biased towards its closed position.

10. A hydronic circulator of claim 3 wherein said valve member includes a substantially cylindrical portion and a ring portion having a substantially V-shaped or U-shaped cross-section, said ring portion protruding radially from an outer surface of the cylindrical portion and being positioned so that one surface of the ring portion seats against the edge of the aperture of the first portion of the housing when said check valve is in its closed position.

11. A hydronic circulator of claim 10 wherein said valve member includes two substantially cylindrical portions, one above and one below the ring portion, said cylindrical portions having different diameters.

12. A hydronic circulator of claim 3 wherein said valve member includes a resilient member mounted to seat against an edge of the aperture of the first portion of the housing when the valve is in its closed position and move towards the eye in response to flow from the inlet.

13. A hydronic circulator of claim 12 wherein said valve member moves towards the eye by the periphery of the resilient member moving vertically towards the eye.

14. A hydronic circulator of claim 12 wherein said valve member moves towards the eye by the resilient member folding up towards the eye about a central retaining member.

15. A hydronic circulator of claim 1 or 2 wherein said check valve is a rotational thrust valve.

16. A hydronic circulator of claim 15 wherein said rotational thrust valve comprises a stationary disc positioned adjacent the eye and having an aperture and a solid portion;

a rotating disc, having an aperture, a rotational thrust vane which will rotate said rotating disc in response to flow of water over a surface of said rotating disc that faces said inlet, and a rotational stop which will limit rotation of said rotating disc, said rotating disc being mounted adjacent the stationary disc and downstream therefrom and being rotatable between a first position in which said aperture in said rotating disc is aligned with said solid portion of said stationary disc and a second position in which said aperture in said rotating disc is aligned with said aperture in said stationary disc; and a resilient member that biases said rotating disc towards its first position.

17. A hydronic circulator of claim 1 or 2 wherein said check valve is a pop-up valve.

18. A hydronic circulator of claim 1 or 2 wherein said check valve provides a metal-to-metal seal.

19. A hydronic circulator of claim 3 wherein said valve member is biased towards a closed position by a spring-loaded valve stem.

20. A hydronic circulator of claim 19 wherein said valve member includes a sealing element disposed at one end of said valve stem.

21. A hydronic circulator of claim 20 wherein said valve member further includes a plunger member dimensioned to receive said sealing element.

22. A hydronic circulator of claim 20 wherein said sealing element has a semi-spherical sealing surface.

23. A hydronic circulator of claim 21 wherein said sealing element has a semi-spherical sealing surface dimensioned to contact an inner cup-shaped surface of said plunger member.

* * * * *